Nov. 22, 1955
C. D. MAGNESEN
2,724,608
CAP RINGS OR RETAINER BANDS AND
METHOD OF MAKING THE SAME
Filed March 2, 1951
2 Sheets-Sheet 1
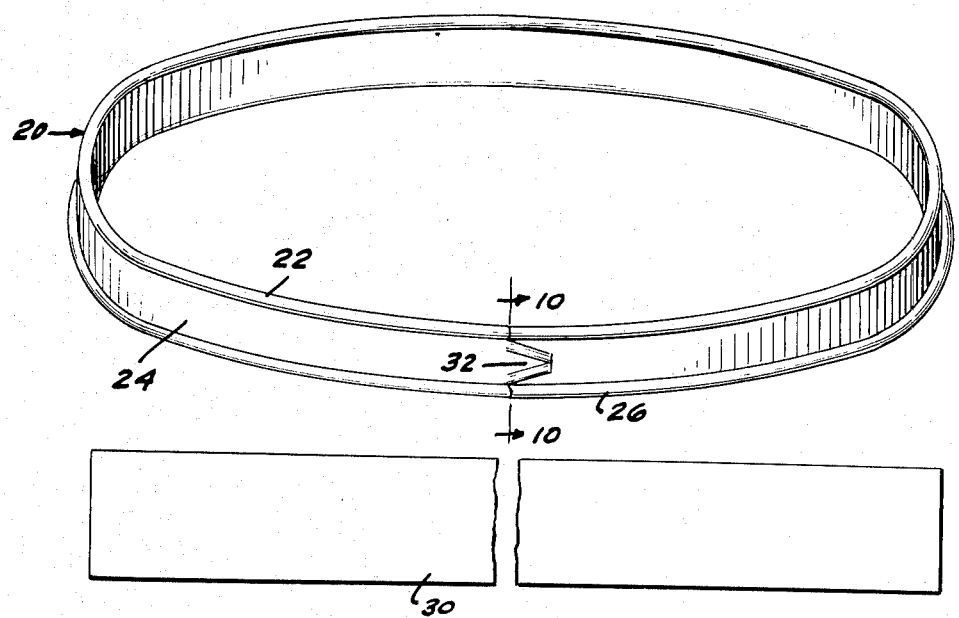
Fig. 1.
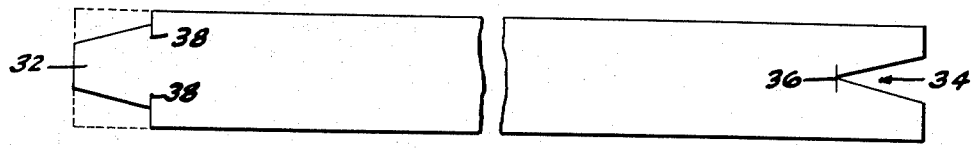
Fig. 2.
Fig. 3.
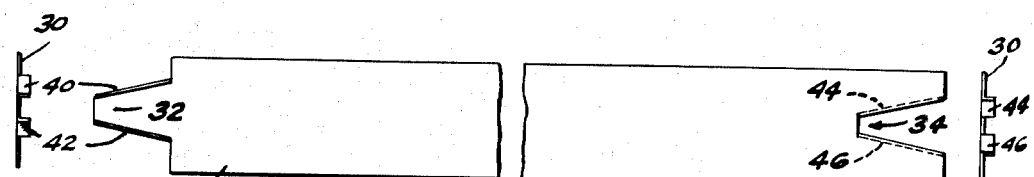
Fig. 5.  Fig. 4.  Fig. 6.
INVENTOR.
CHARLES D. MAGNESEN
BY
Harry H. Hitzeman
ATTORNEY.

Nov. 22, 1955
C. D. MAGNESEN
2,724,608
CAP RINGS OR RETAINER BANDS AND
METHOD OF MAKING THE SAME
Filed March 2, 1951
2 Sheets-Sheet 2
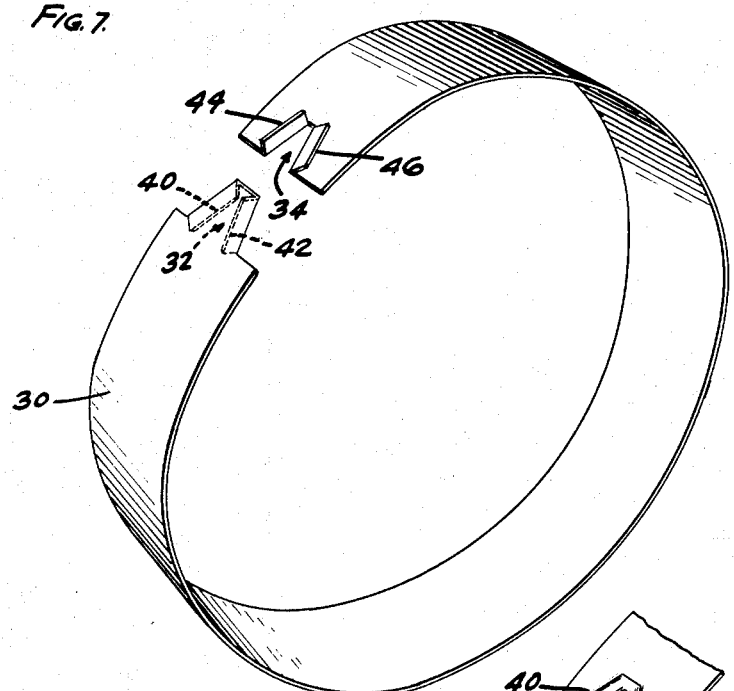
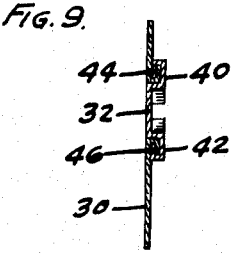
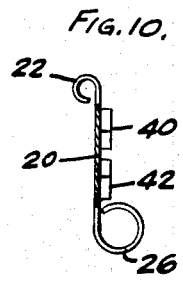
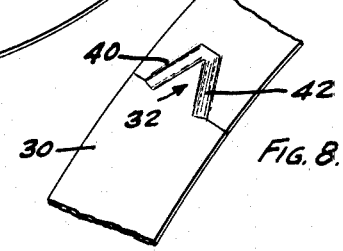
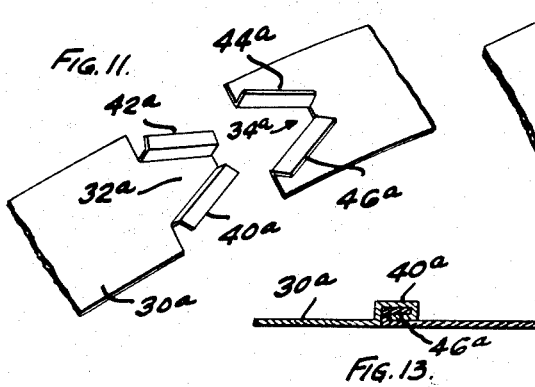
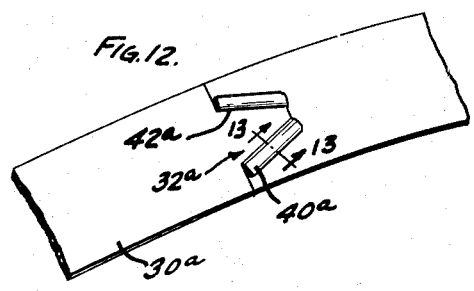
INVENTOR.
CHARLES D. MAGNESEN
BY
Harry H. Hitzeman
ATTORNEY.

United States Patent Office 2,724,608
Patented Nov. 22, 1955

2,724,608

CAP RINGS OR RETAINER BANDS AND METHOD OF MAKING THE SAME

Charles D. Magnesen, Oak Park, Ill., assignor to Magnesen Seal & Closure Company, a corporation of Illinois Application March 2, 1951, Serial No. 213,633

9 Claims. (Cl. 292—256.6)

My invention relates to improvements in the method of making cap rings or retainer bands and the rings or bands produced by the use of said method.

Cap rings or retainer bands of the type to which I refer are almost universally made today from a blank, usually square and of a size larger than the diameter of the ring. The center is punched out and the flat round blank is punched out of the square, thus producing as waste the center punch-out and the material around the ring blank. Hence with retainer rings or cap bands of a diameter of five inches or more, as much as 80% of the original material is wasted.

The principal object of the present invention is to provide a method of manufacturing cap rings or similar articles from a flat continuous band of sheet material.

A further object of the invention is to provide a method of manufacturing cap rings of the type described and fastening the ends together in a fixed unstretchable connection without the use of solder or spot welding.

A further object of the invention is to provide a method of manufacturing cap rings or similar objects out of a flat continuous strip of material wherein the amount of waste material is practically negligible.

A further object of the invention is to provide an improved type of cap ring or retainer band formed of a flat strip of material wherein the ends are mechanically interconnected in such manner that the cap band is incapable of stretching or becoming separated at the connection.

Other objects and advantages will be more apparent from the following description wherein reference is had to the accompanying drawings, upon which Fig. 1 is a front perspective view of a cap ring constructed in accordance with my invention, Figs. 2 to 10 illustrating the steps of the invention;

Fig. 2 is a plan view of a flat strip of sheet metal, the strip being broken to foreshorten the same;

Fig. 3 is a similar view of the same strip showing the material that is cut away in the first operation;

Fig. 4 is a similar view showing the second step of the operation, which consists in bending down the side walls of the V-shaped slot in the right end of the strip and bending up the side walls of the V-shaped wedge at the left end of the strip;

Fig. 5 is an end view of the strip taken from the left of Fig. 4;

Fig. 6 is an end view of the right end of the strip taken from the right end of Fig. 4;

Fig. 7 is a perspective view of the next step in the operation, showing the strip being bent around a circular horn so that the ledges of the slot and the ledges of the wedge portion may interlock;

Fig. 8 shows the same in interlocked position after pressure has been applied to flatten out the connection between the same;

Fig. 9 is an enlarged cross-sectional view showing the interconnecting ledges taken on the line 9—9 of Fig. 8;

Fig. 10 is a cross-sectional view through the completed link shown in section at the interconnection of the edges of the same, taken generally on the line 10—10 of Fig. 1;

Fig. 11 is a fragmentary perspective view of a modified form of construction wherein the ledges on both ends of the strip are turned upwardly;

Fig. 12 is a similar fragmentary perspective view showing the connection formed at the same; and Fig. 13 is an enlarged cross-sectional view through the connection shown in Fig. 12.

In the embodiment of the invention which I have chosen to illustrate and describe the same, I have shown a comparatively large cap ring or retainer band 20 which is of the usual type that may be employed to hold a reseal cover such as is shown in Magnesen Patent No. 2,556,765 upon the top of a container. These retainer rings normally have a curled-over top edge 22, a depending skirt 24, and an outwardly curled lower edge 26.

In the past it has been the custom to make retainer rings of this type by taking a flat, square sheet and blanking out flat rings, that is, eliminating the material about the diameter of the blank and punching out an inner circular portion to the inner diameter of the blank. It can be appreciated, of course, that by this method a considerable amount of waste material results.

With the present method I employ, a flat strip of material 30 of the desired length to form the diameter of the ring 20 is used. In Fig. 3 I have shown the first operation on the blank 30 which may consist of cutting the material away on the left end of the strip to form the wedge-shaped portion 32, and cutting away a triangular portion in the right end to form the V-slot 34. A cut 36 is made across the end of the slot, as well as a pair of cuts 38 at the inner end of the wedge 32.

The next step in the formation of the ring is to turn up the two side walls 40 and 42 of the wedge portion 32, as shown, and to turn down the two ledges 44 and 46 of the V-shaped slot 34, as shown.

In this condition, the strip 30 is now placed about a horn or other former consistent with the diameter of the ring to be formed in such manner that the downwardly depending ledges 40 and 42 of the wedge portion 32 overlie the upwardly turned ledges 44 and 46 of the slot 34. By now pressing the ledges down into an interlocking relationship, it can be seen that the same will interlock as shown in Fig. 8, and in more detail in the enlarged cross-sectional showing of Fig. 9. Due to the fact that the horn about which the ring is formed is solid and the hammer or die which comes down to compress the ledges together in interlocking relationship has recesses in its face, the inner wall surface between the ends of the strip 30 will be aligned so that a smooth inner wall surface is formed throughout the inside diameter of the ring, the interlocking ledges being slightly raised upon the outside of the ring surface. In view of the fact that the thickness of the sheet metal normally employed for cap rings or retainers of this type is about .010", it can be seen that the thickness of the folded over ledges is not appreciable, the showing in Fig. 9 being greatly exaggerated by reason of the showing of exaggerated thicknesses of the metal.

After the band has thus been formed as shown in Figs. 8 and 9, the top edge is curled inwardly to form the roll 22, and the bottom edge is turned outwardly to form the roll 26 in the usual manner.

By reason of the V-shaped slot and wedge connection between the ends of the strip, it can be seen that the holding area connecting the two ends of the strip together and the angle at which this connection is made provides sufficient strength in the connection so that it is almost as easy to tear the band at any point in its circumference as it is in the joint at the ends.

While it is preferable to make the angle of the wedge and the slot walls between 40° and 60°, the exact angle in some cases may of course depend upon the width of the band to be made and the exact thickness of the material employed. The principal feature of the connection which I have provided resides in the large amount of metal-to-metal connection which has been provided between the two ends of the band and the angle at which this connection is made so that a maximum of tensile strength is provided in the connection, and after it is once made the joint is incapable of stretching or pulling out of shape as has frequently occurred with similar connections which have been made by a straight transverse interlocking between portions of the edges of the band.

In Figs. 11 and 12 I have shown a modified form of construction in which I provide a slot 34a at one end of the band 30a, the slot being provided with a pair of upturned ledges 44a and 46a. The other end of the band 30a may be formed with a wedge portion 32a and a pair of upwardly and outwardly turned ledge portions 40a and 42a. In the same manner the band 30a may be formed around a horn or other suitable mandrel, and with a die hammer the ledges may be interlocked, the right-angle ledge members 40a and 42a forming around the ledge members 44a and 46a to form a rigid unstretchable interlock between the ends of the band.

From the above and foregoing description it can be seen that I have provided a highly improved method of constructing cap rings or retainer bands by the use of which the amount of waste material is almost entirely eliminated, the small amount of waste being only those portions of the strip 30 shown in dotted lines in Fig. 3 of the drawings, and being comparatively negligible.

I contemplate that the band which I have provided may be used for fiber strips or any other material employed in making locking bands about containers or drums, it being only necessary to connect the end sections of the strips formed of sheet metal in the manner shown, the strips being capable of attachment to the fiber or other material and being only short connecting ends on the same.

I contemplate that changes and modifications may be made in the exact details shown, and I do not wish to be limited in any particular; rather what I desire to secure and protect by Letters Patent of the United States is:

1. The method of manufacturing a cap ring from a flat narrow strip of sheet metal which comprises the steps of cutting a V-shaped slot at one end of said strip and cutting out the other end of said strip to leave a generally V-shaped wedge portion wider than the slot at the opposite end, bending down the two side walls of the V-shaped slot and bending up the two side walls of the V-shaped wedge portion, bending the side walls of the V-shaped slot outwardly at an angle, bending the side walls of the V-shaped wedge portion inwardly to the same angle and then forming the strip around a former with the side walls of said wedge portion adapted to hook under the side walls of said V-shaped slot, and pressing the same into interlocking connection.

2. The method of manufacturing an enclosing band from a flat narrow strip of sheet metal which comprises the steps of cutting a slot at one end of said strip and cutting out the other end of said strip to leave a wedge portion at the opposite end, bending downwardly and upwardly the side walls of the slot and bending upwardly and inwardly the side walls of the wedge portion and then bending the strip around a former with the walls of said wedge portion adapted to hook under the walls of said slot, and pressing the same into interlocking connection.

3. The method of manufacturing an enclosing band from a flat narrow strip of sheet metal which comprises the steps of cutting a V-shaped slot on a 45° angle at one end of said strip and cutting out the other end of said strip to leave a generally V-shaped wedge at a similar angle wider than the slot at the opposite end, bending downwardly and outwardly the two side walls of the V-shaped slot and bending upwardly and inwardly the two side walls of the V-shaped wedge and then forming the strip around a horn to form a closed band with the side walls of said wedge adapted to hook under the side walls of said V-shaped slot, and pressing the same into interlocking connection.

4. The method of manufacturing a cap ring from a flat narrow strip of sheet metal which comprises the steps of cutting a notch at one end of said strip and cutting out the other end of said strip to leave a similarly shaped wedge portion greater than the notch at the opposite end, bending downwardly and outwardly the side walls of the notch and bending upwardly and inwardly the side walls of the wedge portion and then bending the strip around a horn to form a closed ring with the side walls of said wedge portion adapted to hook under the side walls of said notch, and pressing the same into interlocking connection.

5. A cap ring formed from a flat narrow strip of sheet metal, said cap ring having a connection between opposed ends of said strip comprising a V-shaped wedge member extending from one end and a complementary V-shaped slot in the other end, and interconnecting means therebetween including parallel interengaging side walls, said interengaging side walls flattened against the outside surface of said cap ring so that a smooth inner surface for said cap ring is provided, one edge of said ring curled inwardly and the other edge curled outwardly with said end connection between said edges.

6. A circular retainer band formed from a flat narrow strip of sheet metal connected together at its free ends, said strip having parallel side edges, one end of said strip terminating in an outwardly projecting wedge portion converging toward the free end, the side edges of said wedge portion having upwardly bent flanges, the opposite end of said strip having an inwardly directed wedge-shaped slot with the large end of the slot adjacent the free end of the strip, the edges of the slot having downwardly projecting flanges, the edge flanges of the projecting wedge portion and the edge flanges of the slot co-acting when said wedge and slot are in mating position to lock the ends of said strip together with the edges of said free ends abutting.

7. A circular retainer band formed from a flat narrow strip of sheet metal connected together at its free ends, said strip having parallel side edges, one end of said strip terminating in an outwardly projecting wedge portion converging toward the free end, the edges of said wedge portion having upwardly and inwardly bent flanges, the opposite end of said strip having an inwardly directed wedge-shaped slot with the large end of the slot adjacent the free end of the strip, the edges of the slot having downwardly and outwardly turned flanges, the edge flanges of the projecting wedge portion and the edge flanges of the slot co-acting when said wedge and slot are in mating position to lock the ends of said strip together with the edges of said free ends abutting.

8. A circular retainer band formed from a flat narrow strip of sheet metal connected together at its free ends, said strip having parallel side edges, one end of said strip terminating in an outwardly projecting wedge portion converging toward the free end, the edges of said wedge portion having upwardly bent flanges, the opposite end of said strip having an inwardly directed wedge-shaped slot with the large end of the slot adjacent the free end of the strip, the edges of the slot having flanges, the edge flanges of the projecting wedge portion and the edge flanges of the slot co-acting when said wedge and slot are in mating position to lock the ends of said strip together with the edges of said free ends abutting, said interengaging flanges flattened against the outside surface of said retainer band so that a smooth inner surface for said retainer band is provided.

9. A circular retainer band formed from a flat narrow strip of sheet metal connected together at its free ends, said strip having parallel side edges, one end of said strip terminating in an outwardly projecting wedge portion converging toward the free end, the edges of said wedge portion having upwardly bent flanges, the opposite end of said strip having an inwardly directed wedge-shaped slot with the large end of the slot adjacent the free end of the strip, the edges of the slot having flanges, the edge flanges of the projecting wedge portion and the edge flanges of the slot co-acting when said wedge and slot are in mating position to lock the ends of said strip together with the edges of said free ends abutting, said interengaging flanges flattened against the outside surface of said retainer band so that a smooth inner surface for said retainer band is provided, one edge of said band being curled inwardly and the other edge being curled outwardly, said end connection being between said edges.

References Cited in the file of this patent

UNITED STATES PATENTS

| | | |
|---|---|---|
| 59,007 | Gridley | Oct. 23, 1866 |
| 206,883 | Kittson | Aug. 13, 1878 |
| 1,228,256 | Stall | May 29, 1917 |
| 1,378,508 | Woodward | May 17, 1921 |
| 1,731,478 | Widell | Oct. 15, 1929 |
| 1,773,856 | Peters | Aug. 26, 1930 |
| 2,556,765 | Magnesen | June 12, 1951 |

FOREIGN PATENTS

| | | |
|---|---|---|
| 640,145 | Germany | Dec. 23, 1936 |